ELECTRIC PULSE DISTRIBUTORS

Filed Feb. 19, 1954 2 Sheets-Sheet 1

INVENTOR
JOHN GILBERT LITTLE
BY
ATTORNEY

INVENTOR
JOHN GILBERT LITTLE
BY
ATTORNEY

United States Patent Office 2,867,722

Patented Jan. 6, 1959

2,867,722

ELECTRIC PULSE DISTRIBUTORS

John Gilbert Little, Harrow, England, assignor to The General Electric Company Limited, London, England Application February 19, 1954, Serial No. 411,493

6 Claims. (Cl. 250—27)

Figure 1:
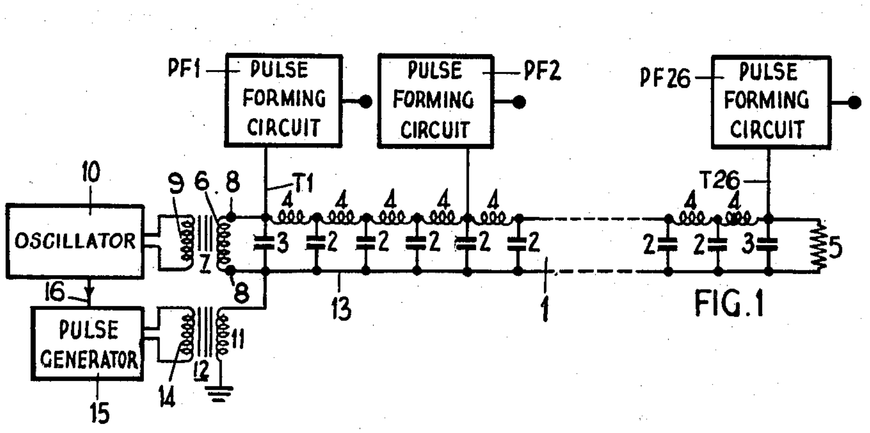

The present invention relates to electric pulse distributors and particularly to those distributors employing a phase shifting network of a type comprising a plurality of sections connected in cascade. As is well known, electric pulse distributors are employed, for example, in multichannel electric signalling systems using time division multiplex techniques, the distributors supplying pulses, which are used to bring the several channels of the system into operation successively in the required order.

In one simple known form of distributor employing a phase shifting network, a train of rectangular voltage pulses, having a recurrence frequency equal to that of the desired output pulse trains (i. e. equal to the channel recurrence frequency in a case in which the distributor is employed in a multichannel signalling system in which the channels are interlaced in a regular cyclic order), is applied to the input of a low pass filter network, which acts as a delay network for the applied pulses, and output pulse trains thus appear at tappings spaced along the network, these pulse trains having the same recurrence frequency as the input pulse train but being delayed on it in time by fractions of the pulse recurrence interval. The magnitudes of the delays of the various output pulse trains are determined by the electrical distances of the output tappings from the input of the network. Often, the tappings are spaced regularly along the network so that the output pulse trains are delayed by equal fractions of the pulse recurrence interval of the input pulse train, and the various output pulse trains are therefore interlaced with one another in regular cyclic order. The length of the network is usually such that a pulse travels down it in a time approximately equal to the pulse recurrence interval. In a multichannel signalling system the output pulse trains appearing at the tappings are each applied to actuate equipment of a corresponding one of the signal channels of the system, the pulses of each train in that way defining the channel intervals of one of the channels.

One disadvantage of the above arrangement is that unless the delay network is carefully designed to pass high frequency components, consequently becoming expensive and bulky, the pulses become distorted as they pass down the delay network, the front and back edges becoming sloping and the peaks rounded. The distortion is greater for a given network if the applied pulses are shortened. It is not then possible without using special circuits which either reshape the output pulses or are responsive to a predetermined level in the leading edges of the output pulses, to time the actuation of the individual channel equipments accurately. Even if these circuits are employed, timing errors may still arise owing to slight irregularities in the network itself, due to component tolerances, temperature variations and like causes.

In another simple known form of distributor employing a phase shifting network, a substantially sinusoidal voltage wave having a frequency equal to the recurrence frequency of the desired output pulse trains is applied to the input of either a low pass or a high pass filter network, having a cut off frequency respectively above or below the frequency of the wave. Similar sinusoidal voltage waves of the same frequency will then appear at output tappings spaced along the network, these waves being retarded or advanced (depending on whether the filter is a low pass or a high pass one respectively) in phase by fractions of a cycle determined by the relative spacings of the output tappings and the input terminals. In this case again, the output tappings are usually spaced at regular intervals along the network and as a result the output waves are shifted in phase successively by equal fractions of a cycle, the length of the whole network being equivalent to a phase shift of one cycle or less. The output waves are each applied to a separate one of a number of similar wave shaping circuits to derive from each a train of approximately rectangular pulses having a timing related to the phase of the wave from which it is derived. These pulse trains are consequently interlaced with one another in time and as before may be employed to define the channel intervals of the different channels of a multichannel signalling system.

In this known form of distributor also disadvantages may arise unless complex and expensive circuits are employed. Apart from any inaccuracies inherent in the network itself, the shaping circuits, to which the output waves are applied, are likely to give rise to unacceptable inaccuracies in timing. For example variations might arise due to the differing characteristics of a sample of valves of a given type, or due to the ageing of an individual valve in time.

It is an object of the present invention to provide an improved electric pulse distributor employing a phase shifting network of the type comprising a plurality of sections connected in cascade.

According to the present invention an electric pulse distributor comprises means for generating a cyclic control wave having a period equal to the required recurrence period of the distributor, a phase shifting network of a type comprising a plurality of similar sections connected in cascade and having input terminals and a plurality of output tappings spaced along it in one direction from the input terminals (one of said output tappings may be coincident with the input terminals), the characteristics of the phase shifting network being determined in relation to those of the control wave so that, on application of the control wave to the input terminals of the network, it appears at points spaced along the network from the input terminals with its phase either advanced or retarded by progressively greater amounts as the electrical distance from the input terminals increases, and the output tappings being spaced along the network so that the phase difference between the waves appearing at any two successive output tappings is an integral multiple of a fraction of the form $1/p$ (where $p$ is an integer greater than one) of the phase difference between the waves appearing at the two extreme output tappings, a pulse generator for generating a train of short sharp pulses, which are regularly and have a recurrence interval equal to the time equivalent of the phase change of the control wave between the most closely spaced pair(s) of output tappings, and a plurality of pulse forming means, coupled one to each of the output tappings, each responsive to pulses from said pulse generator, when superimposed on a particular section of a cycle of the control wave, to derive in response to each such pulse an output pulse having at least one substantially instantaneous edge occurring at a time determined by the time of occurrence of said pulse.

The cyclic control wave is a substantially sinusoidal voltage wave of frequency equal to the recurrence frequency of the distributor, the phase shifting network is either a low pass or a high pass filter network having a cut-off frequency respectively greater or less than the frequency of the control wave so that the phase of the control wave is respectively retarded or advanced by progressively greater amounts at points spaced along the network from the input terminals. Where the pulses from the pulse generator are positive-going, the pulse forming means may be responsive to a pulse superimposed on that part of the wave near its mean potential in which it is increasing towards said mean potential, the pulse being that one which just causes the total potential to increase beyond the mean potential. Where the pulses from the pulse generator are negative-going, the pulse forming means may be responsive to a pulse superimposed on that part of the wave near its mean potential in which it is decreasing towards said mean potential, the pulse being that one which just causes the total potential to decrease beyond the mean potential.

Where the phase shifting network is a low pass filter network it may comprise a plurality of sections connected in cascade each comprising series inductance and shunt capacitance, the sides of the capacitances not connected to the inductances being connected by a common conductor and the output from the pulse generator being applied between the common conductor and earth.

Where the phase shifting network is a high pass filter network it may comprise a plurality of sections each comprising series capacitance and shunt inductance, and the output from the pulse generator may be connected in series with the control wave generator across the input terminals of the network. In a simple case in which the output pulses from the distributor are regularly distributed over each recurrence period and the output tappings are spaced at regular intervals along the network from the input terminals, the first one being coincident with the input terminals and the last one being spaced from the first so that the phase shift between the first and the last output tappings is equal to $2\pi(n-1)/n$, where $n$ is the number of output tappings.

Figure 2:
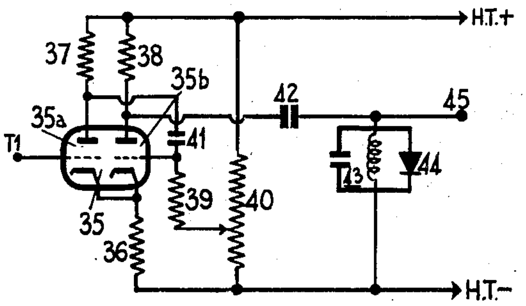
Figure 3:
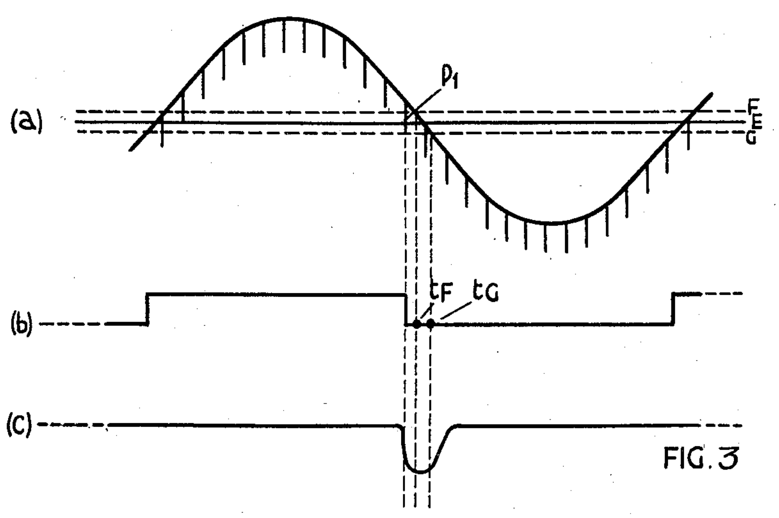
Figure 4:
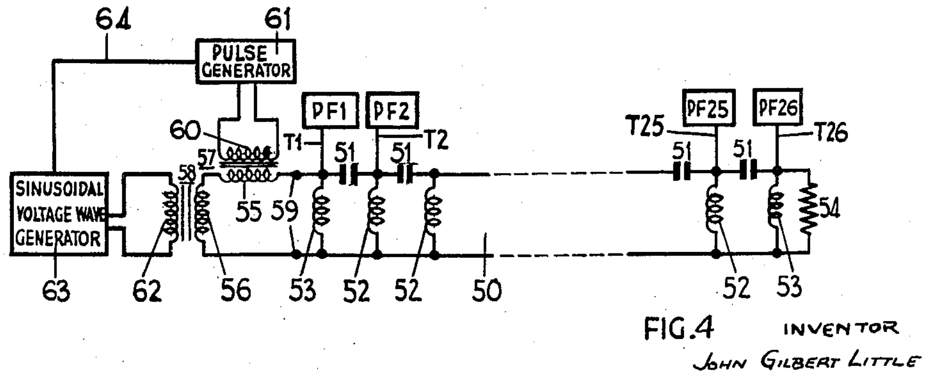

Two electric pulse distributors for a twenty six channel pulse time modulation signalling system will now be described with reference to the accompanying drawings in which, Figure 1 shows a circuit diagram, partly in block, of the first distributor, Figure 2 shows a detailed circuit diagram of part of the first distributor, Figure 3 shows waveforms illustrating the operation of both the first and the second distributor and, Figure 4 shows a circuit diagram, partly in block, of the second distributor.

The distributor, of which a circuit diagram is shown in Figure 1 of the accompanying drawings comprises a phase shifting network 1 of the low pass filter type, having a cut-off frequency of 300 kc./s., and the control wave applied to it has a sinusoidal voltage waveform. The network 1 is made up of one hundred equal $\pi$-sections (only five of which are shown in Figure 1) each comprising two shunt capacitances and a series inductance, the capacitances being 2850 picofarads and the inductances 232 microhenries. Where, at the junction of two sections, two capacitances each of 2850 picofarads would otherwise be connected in parallel, single capacitances of 5700 picofarads are employed. Thus in Figure 1 the capacitances 2 at intermediate points along the network are each of 5700 picofarads, while only the two end capacitances 3 are of 2850 picofarads. As shown in Figure 1 each section includes a single inductance 4, which has, as stated, a magnitude of 232 microhenries. In addition the inductances are mounted close to one another so that there is a mutual inductance between successive sections, the mutual inductance being equal to 5% of the inductance per section, that is approximately 11 microhenries. The network has a characteristic impedance of 220 ohms and a terminating resistance 5 of that magnitude is connected across the last section. The secondary winding 6 of a transformer 7 is connected across the input terminals 8 of the network 1, the primary winding 9 of the transformer 7 being connected across the output terminals of oscillator 10.

The oscillator 10 is arranged to generate a sinusoidal voltage wave having a frequency of 8 kc./s.

The secondary winding 11 of a pulse transformer 12 is connected between the common lead 13 of the network 1 (in most applications of low pass filter networks this common lead 12 is usually earthed) and earth, whilst the primary winding 14 of the transformer 12 is connected across the output from a pulse generator 15. This pulse generator 15 is synchronised to an output from the oscillator 10, supplied to it through the lead 16, and generates a train of short positive-going pulses of 0.5 microsecond duration having a recurrence frequency of 208 kc./s., that is having a recurrence period of 4.81 microseconds. The recurrence frequency of the pulse generator 15 is the twenty sixth harmonic of the frequency of the oscillator 10. In practice since the recurrence frequency of the oscillator 10 determines the recurrence frequency of the whole distributor, this frequency will usually be crystal controlled.

The network 1 acts in operation as a delay network for the sine wave applied to it from the oscillator 10. Twenty six output tappings T1–26 are connected at equal intervals along the network, the first tapping T1 being connected to the input end of the first section of the network 1, whilst the remaining tappings T2–26 are spaced at regular intervals being connected after every fourth section along the network 1. The characteristics of the network 1 are such that the delay between a successive pair of output tappings T1–26, for example between the tappings T1 and T2, is equal to 4.81 microseconds, the total delay between the tappings T1 and T26 being 120.25 microseconds, that is $25/26$ of 125 microseconds the period of the oscillator 10.

The waveform appearing at the output tappings T1–26 consists in each case of a sine wave having a phase characteristic of the particular tapping, on which is superimposed the pulse train generated by the pulse generator 15. The pulse forming circuits PF1–26 serve to select a series consisting of every twenty sixth one of the pulses superimposed on the control wave, the series being a different one at each of the twenty six tappings T1–26 and being that which is superimposed in each case on a particular section of the waveform of the control wave, the section having different timings at each tapping by virtue of the differing phases of the sine waves at each tapping. The circuit of one of these pulse forming circuits PF1–26 is shown in Figure 2 of the accompanying drawings. It includes a bistable trigger circuit, which is caused to change from one of its conditions to the other by excursions of the input waveform through earth potential. Thus if a simple sine wave were employed the trigger circuit would change from one condition to the other on the passage of the sine wave through zero increasing from negative to positive and would change back from the other condition to the first condition one half a cycle later on the passage of the sine wave back through zero level when decreasing from positive to negative. The trigger circuit thus generates what is sometimes known as a square wave, having a frequency equal to that of the sine wave applied to it. On superimposing a pulse train from the pulse generator 15 on a sine wave it is possible to determine the times of occurrence of the changes in one direction more accurately, by making them coincide with particular ones of the superimposed pulses. Thus if the pulse train superimposed on the sine wave is negative-going one of those pulses, if their amplitude and timing is suitably arranged, will cause the input potential to the trigger circuit to decrease below zero, at a time just before that at which the sine wave itself will decrease below zero. As the edge of the pulse is much steeper than the sine wave itself, the triggering of the trigger circuit is much more precise, and the time of occurrence of the changes of the trigger circuit is consequently determined more accurately. Similarly if a positive-going pulse train from the pulse generator 15 is superimposed on the sine wave, it can be arranged that one of the pulses will cause the potential applied to the trigger circuit to increase above zero slightly before the sine wave would normally do so. In a similar manner therefore it is possible to determine the times of occurrence of the corresponding changes in the state of the trigger circuit more accurately.

Referring now to Figure 2 of the accompanying drawings, the pulse forming circuit includes two stages, the first being the trigger circuit, and the second being a stage for deriving suitable gating pulses from the output from the trigger circuit. The first stage includes a double triode thermionic valve 35, the cathodes of the two constituent triodes 35*a* and 35*b* being connected together and to one terminal of a cathode load resistor 36, the other terminal of which is connected to the negative side of a suitable high tension voltage supply, which is not shown in the drawings. Anode load resistors 37 and 38 are connected between the anodes of the two triodes 35*a* and 35*b* respectively and the positive side of the same high tension voltage supply. The control grid of the triode 35*a* is connected directly to the appropriate output tapping on the network 1, for example the output tapping T1 in the case of the pulse forming circuit PF1. The control grid of the triode 35*b* is connected through a resistor 39 to the slider of a potentiometer 40 which is connected across the high tension voltage supply, whilst a small capacitor 41 is connected between the anode of the triode 35*a* and the control grid of the triode 35*b*. The slider of the potentiometer 40 is set so that if a varying potential, for example a sine wave, is applied to the control grid of the triode 35*a* the circuit will change between the two possible conditions, the one with the triode 35*a* conducting and the triode 35*b* non-conducting and the other with the conditions of the triodes 35*a* and *b* reversed, when the potential at the control grid of the triode 35*a* passes in a suitable direction through earth potential. Thus if a sine wave is applied to the control grid of the triode 35*a* the triode 35*a* will be non-conducting during the negative half cycles and conducting during the positive half cycles, the changes between the two conditions taking place as the potential of the sine wave passes through zero. The triodes 35*a* and *b* are of a type having a short grid base, and in any case the positive feedback introduced by the capacitor 41 ensures that the changes occur substantially instantaneously. However by superimposing a train of pulses from the pulse generator 15 as described above the time of occurrence of the changes in one direction may be determined more accurately. This is illustrated in Figures 3(*a*) and (*b*), which show waveforms illustrating the operation of the trigger circuit, for the case in which the pulse train superimposed on the sine wave is negative-going. Figure 3(*a*) shows the waveform applied to the input of the circuit together with earth potential level E, and two levels F and G representing the extremes of the grid base of the triode 35*a*. Figure 3(*b*) shows the corresponding output waveform at the anode of the triode 35*b*, consisting of a square wave of the same frequency as the sine wave of Figure 3(*a*). It will be seen however that if the pulses are not superimposed on the sine wave, there is a finite time during which the sine wave traverses the grid base of the triode 35*a* lying between the levels F and G in Figure 3(*a*), and there is thus a corresponding finite period $t_F - t_G$ during which the corresponding change of condition may occur in the trigger circuit, and this gives rise to an indeterminacy in the time of occurrence of that change. However by superimposing the pulses from the pulse generator 15 on the sine wave, one of the pulses, that given the reference P1 in Figure 3(*a*), causes the potential at the control grid of the triode 35*a* to traverse the whole of the grid base substantially instantaneously at a time slightly before that at which the sine wave itself would traverse the grid base. As a result the time of occurrence of the corresponding change of the trigger circuit is determined solely by the time of occurrence of the pulse P1.

Referring again to Figure 2 of the accompanying drawings the potential appearing at the anode of the triode 35*b* is applied through a coupling capacitor 42, to shock-excite a damped resonant circuit 43 having a germanium crystal rectifier 44 connected in parallel with it. The polarity of the rectifier 44 is such that only negative-going voltage swings may appear at the output terminal 45, the positive-going voltage swings being damped out completely owing to the rectifier 44 becoming conducting. Thus, as illustrated in Figure 3(*c*), which shows the waveform appearing at the terminal 45 in response to the waveform of Figure 3(*b*), a negative-going pulse is generated at the terminal 45 in response to each negative-going step in the square wave of Figure 3(*b*), these steps being the ones the times of occurrence of which is determined solely by the pulses P1 of Figure 3(*a*). The negative-going pulses of Figure 3(*c*) are in fact the first half cycle of an oscillation shock-excited in the resonant circuit 43, and their duration can therefore be determined by the frequency of the circuit 43. The leading edges of the output pulses appearing across the resonant circuits 43 in the various pulse forming circuits PF1–26 are delayed on one another in succession by 4.81 microseconds, that being the time equivalent of the phase change in the control wave between successive ones of the output tappings T1–26.

The network 1 need not be of such high quality as shown in Figure 1. Thus the network may be made up with only one section between each of the output tappings T1–26, and no mutual inductance between sections is required.

In one network which has been employed with a control wave in the form of 8 kc./s. sinusoidal voltage wave, a single inductance was connected between each of the tapping T1–26 of 4.76 millihenries, the capacitances at intermediate points being 4830 picofarads, the two end capacitances being 2415 picofarads, and the terminating resistor 1000 ohms. The cut-off frequency of this network was 67 kc./s.

The circuit of a second distributor in accordance with the present invention is shown in Figure 4 of the accompanying drawings, the distributor comprising a phase shifting network 50 of the high pass filter type and the control wave applied to the network 50 being in the form of a sinusoidal voltage wave. The network 50 is made up of 25 equal $\pi$-sections (only some of which are shown in Figure 4) each comprising two shunt inductances and a series capacitance, the capacitances being 0.0832 microfarad and the inductances 164 millihenries. Where, at the junction of two sections, two inductances each of 164 millihenries would otherwise be connected in parallel, single inductances of 82 millihenries are employed. Thus in Figure 4 the capacitances 51 are each 0.0832 microfarad the inductances 52 are each 82 millihenries and the inductances 53 are each 164 millihenries, a terminating resistance 54 of magnitude 1000 ohms is connected in parallel with the last section to terminate the network 50, 1000 being the characteristic imepdance of the network 50. The cut-off frequency of the network is approximately 960 c./s.

The secondary windings 55 and 56 of two transformers 57 and 58 are connected in series across the input terminals 59 of the network 50. The primary winding 60 of the transformer 57 is connected across an output from a pulse generator 61, whilst the primary winding 62 of the transformer 58 is connected across an output from a sine wave oscillator 63.

The frequency of operation of the oscillator 63 is 8 kc./s., in other words the sinusoidal voltage wave generated has a period of 125 microseconds, and in addition an output from the oscillator 63 is applied over the lead 64 to synchronise the pulse generator 61.

The pulse generator 61, which as stated above is synchronised to the generator 63, generates a train of regularly recurrent pulses having durations of 0.5 microsecond, a recurrence frequency of 208 kc./s., and thus a recurrence period of 4.81 microseconds. The recurrence frequency of the pulse generator 61 is the twenty sixth harmonic of the frequency of the oscillator 63, and the output pulses are timed in relation to the sinusoidal voltage wave output from the oscillator 63, so that, as illustrated in Figure 3($a$), a pulse occurs shortly before each occasion on which the voltage wave decreases through its mean value.

The network 50 has twenty-six output tappings T1–26 connected to it, the first of these being connected directly to the input end of the first section and the remainder being connected in order at the junctions of successive sections. As in the case of the distributors described with reference to Figure 1 each of the output tappings T1–26 is connected to the input of one of twenty-six pulse forming circuits PF1–26. Apart from the difference arising from the fact that the network 50 is of the high pass filter type instead of the low pass filter type the operation of the distributor is the same as that of the distributor described previously. The only significant difference is that the phase of the sinusoidal voltage wave appearing at the output tappings T1–26 is advanced between one output tapping and the next along the network 50, instead of being retarded. Owing to the different constitution of the network 50, from that of the network 1 in Figure 1, the input from the pulse generator 61 is connected in series with the input terminls 59 to the network 50, so that the output from the pulse generator 61 can appear simultaneously at each of the output tappings T1–26.

In the distributors described above the phase change between the extreme output tappings on the network has in all cases been less than $2\pi$. It is however possible to have cases in which the phase change between the extreme output tappings is as much as $4\pi$ or $6\pi$. In these cases the output pulse trains are not derived from the successive output tappings in the order of their timing. Thus where the total change is $6\pi$, every third pulse train, taken in order of timing, may be derived from the output tappings on the first section of phase change $2\pi$, a different set of every third pulse train may be derived from the tappings on the second section of phase change $2\pi$, and the remaining set of every third pulse train may be derived from the tappings on the last section.

It will be appreciated that the distributors described have the advantage that the timing of the pulses in the output pulse trains is independent of the delay line and the form of the control wave as it appears at the various output tappings along the network, since they are merely selected from the output from the pulse generator 10 or 61 as the case may be. The network is in effect acting as a pulse train divider, separating the 208 kc./s. repetition frequency pulse train from the pulse generator 15 or 61 into twenty-six regularly recurrent and regularly spaced pulse trains of 8 kc./s. repetition frequency.

I claim:

1. An electric pulse distributor comprising a phase shifting network which comprises a plurality of similar sections connected in cascade and which has a pair of input terminals and a plurality of output tappings spaced along it in one direction from the input terminals, means to supply across the said input terminals a signal having a substantially sinusoidal voltage waveform, means to supply a train of voltage pulses to at least one of said input terminals of the phase shifting network, and a plurality of pulse forming means which are coupled one to each of the output tappings of the phase shifting network and which are each responsive to the resultant voltage at the output tapping to which it is coupled passing through a value in the region of the mean voltage of the signal having the substantially sinusoidal waveform due to a pulse of the said train being superimposed on that signal as it passes along the phase shifting network.

2. An electric pulse distributor according to claim 1 wherein the phase shifting network is a high pass filter network and comprises a plurality of sections each comprising series capacitance and shunt inductance.

3. An electric pulse distributor according to claim 2 wherein the means to supply the signal having the substantially sinusoidal voltage waveform and the means to supply the train of voltage pulses are connected in series across the input terminals of the phase shifting network.

4. An electric pulse distributor according to claim 1 wherein each of said pulse forming means includes a bistable trigger circuit which is caused to change from one of its stable conditions to the other by an excursion through the said mean voltage as aforesaid of the voltage supplied thereto by the output tapping of the phase shifting network to which it is coupled, and means to cause the bistable trigger circuit to change back to the first condition prior to the next such excursion.

5. An electric pulse distributor according to claim 4 wherein each of said pulse forming means includes a circuit which is coupled to the trigger circuit and which is responsive to a change from the said one condition to the other only, to derive an output pulse having at least one edge occurring at a time determined by the said change.

6. An electric pulse distributor according to claim 5 wherein said circuit coupled to the trigger circuit comprises a parallel resonant circuit and a rectifying device connected in parallel with the resonant circuit, the polarity of the rectifying device being such that oscillations can only be excited in the resonant circuit by the potential changes applied across it from the trigger circuit when the latter changes from its one condition to the other.

References Cited in the file of this patent

UNITED STATES PATENTS

| | | |
|---|---|---|
| 2,462,111 | Levy | Feb. 22, 1949 |
| 2,516,888 | Levy | Aug. 1, 1950 |
| 2,588,925 | Hecht | Mar. 11, 1952 |
| 2,666,181 | Courtillot | Jan. 12, 1954 |